US 6,571,030 B1

(12) United States Patent
Ramaswami et al.

(10) Patent No.: US 6,571,030 B1
(45) Date of Patent: May 27, 2003

(54) OPTICAL CROSS-CONNECT SWITCHING SYSTEM

(75) Inventors: Rajiv Ramaswami, Sunnyvale, CA (US); Steven T. Tabaska, Los Altos Hills, CA (US); Robert R. Ward, Sunnyvale, CA (US)

(73) Assignee: XROS, Inc., Santa Clara, CA (US)

( * ) Notice: Subject to any disclaimer, the term of this patent is extended or adjusted under 35 U.S.C. 154(b) by 90 days.

(21) Appl. No.: 09/704,457

(22) Filed: Nov. 1, 2000

Related U.S. Application Data

(60) Provisional application No. 60/162,936, filed on Nov. 2, 1999, provisional application No. 60/170,094, filed on Dec. 10, 1999, provisional application No. 60/170,095, filed on Dec. 10, 1999, provisional application No. 60/170,093, filed on Dec. 10, 1999, provisional application No. 60/170,092, filed on Dec. 10, 1999, provisional application No. 60/186,108, filed on Mar. 1, 2000, and provisional application No. 60/200,425, filed on Apr. 28, 2000.

(51) Int. Cl.$^7$ ................................................. G02B 6/26
(52) U.S. Cl. ............................. 385/17; 385/15; 385/16; 385/18; 385/48
(58) Field of Search ............................. 385/15, 16, 17, 385/18, 20, 21, 48

(56) References Cited

U.S. PATENT DOCUMENTS

| 3,651,392 A | 3/1972 | Frisch et al. ................. 318/561 |
| 4,437,190 A | 3/1984 | Rosenwaig et al. ...... 359/130 X |
| 4,470,154 A | 9/1984 | Yano ....................... 359/124 X |
| 4,519,670 A | 5/1985 | Spinner et al. ............. 385/24 X |
| 4,530,566 A | 7/1985 | Smith et al. ............... 385/53 X |

(List continued on next page.)

FOREIGN PATENT DOCUMENTS

| EP | 0 674 457 A2 | 9/1995 | |
| EP | A-0 674 457 | 9/1995 | ................ 385/24 X |
| EP | 0721275 A2 | 12/1995 | ............ H04M/3/36 |
| EP | 0752794 A2 | 1/1997 | ............ H04Q/11/00 |

(List continued on next page.)

OTHER PUBLICATIONS

A. Himeno, R. Nagase, T. Ito, K. Kato and M. Okuno; Photonic Inter–Module Connector Using 8×8 Optical Switches for Near–Future Electronic Switching Systems; IEICE Transactions on Communications; E77–B(1994) Feb., No. 2, Tokyo, JP.

Free–Space Micromachined Optical Switches with Submillisecond Switching Time for Large–Scale Optical Crossconnects, Lin, et al., 04/98, pp. 525–527.

Okamoto, S. et al.; "Optical Path Cross–Connect Node Architectures for Photonic Transport Network", Journal of Lightwave Technology, vol. 14, No. 6, Jun. 1996, pp. 1410–1422.

Lin, L.Y. et al.; "Micro–Electro–Mechanical Systems (MEMS) for WDM Optical–Crossconnect Networks", Milcom 1999; IEEE Military Communications Conf Proceedings; Atlantic City, NJ Oct. 31–Nov. 3, 1999; pp. 954–957.

*Primary Examiner*—Brian Healy
(74) *Attorney, Agent, or Firm*—Blakely Sokoloff Taylor & Zafman LLP

(57) ABSTRACT

In general, an optical cross-connect switching system comprising a switch subsystem, an input/output (I/O) subsystem including a plurality of removable, I/O port modules, and a switch control subsystem featuring servo modules. These units collectively operate to provide optical data paths for routing of light signals without conversion from optical to electrical domains and back to optical. Also, the optical cross-connect switching system is scalable because the I/O port modules, servo modules and even features of the switch subsystem may be removed without disruption in system operation.

51 Claims, 10 Drawing Sheets

U.S. PATENT DOCUMENTS

| | | | |
|---|---|---|---|
| 4,612,670 A | 9/1986 | Henderson | 359/24 X |
| 4,634,239 A | 1/1987 | Burher | 385/15 X |
| 4,897,830 A | 1/1990 | Hill et al. | 359/124 X |
| 4,982,446 A | 1/1991 | Lord et al. | 359/124 X |
| 5,035,482 A | 7/1991 | Ten Berge et al. | 385/15 X |
| 5,157,652 A | 10/1992 | Walker | 370/17 |
| 5,253,274 A | 10/1993 | Janniello et al. | 375/121 |
| 5,272,556 A | 12/1993 | Faulkner et al. | 359/125 |
| 5,299,044 A | 3/1994 | Mosch et al. | 359/110 |
| 5,355,238 A | 10/1994 | Kight et al. | 359/135 |
| 5,477,364 A | 12/1995 | Pearson | 359/139 |
| 5,485,300 A | 1/1996 | Daley | 359/180 |
| 5,487,120 A | 1/1996 | Choy et al. | 385/24 |
| 5,515,361 A | 5/1996 | Li et al. | 370/15 |
| 5,521,732 A | 5/1996 | Nishio | 359/120 |
| 5,521,734 A | 5/1996 | Frigo | 359/152 |
| 5,570,371 A | 10/1996 | Iga | 370/99 |
| 5,629,919 A | 5/1997 | Hayashi et al. | 369/112 |
| 5,729,527 A | 3/1998 | Gerstel et al. | 370/228 |
| 5,745,274 A | 4/1998 | Fatehi et al. | 359/187 |
| 5,781,537 A | 7/1998 | Ramaswami et al. | 370/254 |
| 5,793,746 A | 8/1998 | Gerstel et al. | 370/228 |
| 5,801,863 A | 9/1998 | Fatehi et al. | 359/124 |
| 5,825,877 A | 10/1998 | Dan et al. | 380/4 |
| 5,825,949 A | 10/1998 | Choy et al. | 385/24 |
| 5,867,289 A | 2/1999 | Gerstel | 359/110 |
| 5,892,606 A | 4/1999 | Fatehi et al. | 359/177 |
| 5,900,968 A | 5/1999 | Srivastava et al. | 359/341 |
| 5,963,350 A | 10/1999 | Hill | 385/24 |
| 5,970,201 A | 10/1999 | Anthony et al. | 385/140 |
| 5,978,113 A | 11/1999 | Kight | 359/110 |
| 6,002,818 A | 12/1999 | Fatehi et al. | 385/17 |
| 6,005,993 A | 12/1999 | MacDonald | 385/16 |
| 6,008,915 A | 12/1999 | Zyskind | 359/110 |
| 6,009,220 A | 12/1999 | Chan et al. | 385/24 |
| 6,046,833 A | 4/2000 | Sharma et al. | 359/119 |
| 6,047,331 A | 4/2000 | Medard et al. | 709/239 |
| 6,601,482 | 5/2000 | Davis | 385/17 |
| 6,072,612 A | 6/2000 | Liou et al. | 359/123 |
| 6,081,361 A | 6/2000 | Adams et al. | 359/188 |
| 6,108,311 A | 8/2000 | Ramaswami et al. | 370/258 |
| 6,147,968 A | 11/2000 | De Moer et al. | 370/225 |
| 6,148,124 A | 11/2000 | Aksyuk et al. | 385/24 |
| 6,188,810 B1 | 2/2001 | Baney | 385/11 |
| 6,198,571 B1 | 3/2001 | Yang | 359/337 |
| 6,207,949 B1 | 3/2001 | Jackel | 250/227 |
| 6,222,954 B1 * | 4/2001 | Riza | 385/18 |
| 6,278,812 B1 * | 8/2001 | Lin et al. | 385/18 |
| 6,317,530 B1 * | 11/2001 | Ford | 385/17 |
| 6,374,008 B2 * | 4/2002 | Solgaard et al. | 385/17 |

FOREIGN PATENT DOCUMENTS

| | | | |
|---|---|---|---|
| EP | 0809384 A2 | 5/1997 | H04L/29/14 |
| EP | 0 802 697 A2 | 10/1997 | 385/24 |
| EP | 0857000 A2 | 1/1998 | H04Q/11/00 |
| EP | 0 674 457 A3 | 5/1998 | |
| EP | 0 849 906 A2 | 6/1998 | |
| EP | A-0 849 906 | 6/1998 | 385/24 X |
| EP | A-0 857 000 | 8/1998 | 385/24 X |
| EP | 0938244 A2 | 1/1999 | H04Q/11/00 |
| EP | 0759681 A2 | 2/1999 | 385/24 X |
| EP | 0 898 440 A2 | 2/1999 | |
| EP | 0910138 A1 | 4/1999 | H01S/3/025 |
| EP | 0932069 A1 | 7/1999 | G02F/1/09 |
| EP | A-0 938 244 | 8/1999 | 385/24 X |
| EP | 0953854 A1 | 11/1999 | G02B/6/34 |
| EP | 0994635 A1 | 4/2000 | H04Q/11/04 |
| EP | 0 857 000 A3 | 8/2000 | |
| EP | 1087556 A1 | 3/2001 | H04B/10/21 |
| GB | 2347570 A | 3/1999 | H04J/14/02 |
| WO | WO86/04205 | 7/1986 | H04Q/11/02 |
| WO | WO86/05649 | 9/1986 | H04Q/11/02 |
| WO | WO90/14734 | 11/1990 | H04N/7/22 |
| WO | WO91/01603 | 2/1991 | H04J/14/08 |
| WO | WO95/19689 | 7/1995 | H04Q/11/00 |
| WO | WO97/24822 | 7/1997 | H04B/10/08 |
| WO | WO98/54863 | 5/1998 | H04J/14/02 |
| WO | WO99/13656 | 3/1999 | H04Q/3/52 |
| WO | WO 99/18751 | 4/1999 | |
| WO | WO 99/40738 | 8/1999 | |
| WO | WO 99 40738 A | 8/1999 | 385/24 X |
| WO | WO00/13210 | 9/1999 | G02B/26/08 |
| WO | WO99/48323 | 9/1999 | H04B/10/08 |
| WO | WO99/59272 | 11/1999 | H04B/14/06 |
| WO | WO00/20899 | 4/2000 | |
| WO | WO00/30282 | 5/2000 | H04J/14/02 |
| WO | WO00/52865 | 9/2000 | H04J/14/02 |
| WO | WO01/28136 A1 | 4/2001 | H04B/10/08 |

* cited by examiner

OPTICAL CROSS-CONNECT SWITCHING SYSTEM

CROSS REFERENCE TO RELATED APPLICATIONS

This non-provisional U.S. Patent Application claims the benefit of U.S. Provisional Patent Application No. 60/162, 936 entitled "OPTICAL CROSSCONNECT WITH OPTICAL TO ELECTRICAL CONVERTERS" filed on Nov. 2, 1999 by inventor Rajiv Ramaswami; and also claims the benefit of U.S. Provisional Patent Application No. 60/170, 094 entitled "OPTICAL CROSSCONNECT WITH BRIDGING, TEST ACCESS AND REDUNDANCY" filed on Dec. 10, 1999 by inventors Rajiv Ramaswami and Robert R. Ward; and also claims the benefit of U.S. Provisional Patent Application No. 60/170,095 entitled "OPTICAL CROSSCONNECT WITH LOW-LOSS BRIDGING, TEST ACCESS AND REDUNDANCY" filed on Dec. 10, 1999 by inventors Steven Clark and Rajiv Ramaswami; and also claims the benefit of U.S. Provisional Patent Application No. 60/170,093 entitled "1+1 OPTICAL PROTECTION USING OPTICAL CROSSCONNECT" filed on Dec. 10, 1999 by inventors Rajiv Ramaswami and Robert R. Ward; and also claims the benefit of U.S. Provisional Patent Application No. 60/170,092 entitled "SIGNALING INTERFACE BETWEEN OPTICAL CROSSCONNECT AND ATTACHED EQUIPMENT" filed on Dec. 10, 1999 by inventor Rajiv Ramaswami; and also claims the benefit of U.S. Provisional Patent Application No. 60/186,108 entitled "1:N PROTECTION BETWEEN CLIENTS AND ALL-OPTICAL CROSSCONNECTS" filed on Mar. 1, 2000 by inventors Kent Erickson, Subhashini Kaligotla, and Rajiv Ramaswami; and also claims the benefit of U.S. Provisional Patent Application No. 60/200,425 entitled "OPTICAL CROSSCONNECT SYSTEM" filed on Apr. 28, 2000 by inventors Rajiv Ramaswami, Steve Tabaska, and Robert Ward.

GENERAL BACKGROUND

Over the last few years, the demand for high-speed communication networks has increased dramatically. In many situations, communication networks are implemented with electrical interconnections. As desired levels of bandwidth and transmission speed for communication networks increase, it will become more and more difficult for electrical interconnections to satisfy these levels.

One difficulty associated with electrical interconnections is that they are sensitive to external electromagnetic interference. More specifically, electromagnetic fields that reside in the vicinity of the interconnection lines induce additional currents, which may cause erroneous signaling. This requires proper shielding, which hampers general heat removal.

Another difficulty is that electrical interconnections are subject to excessive inductive coupling, which is referred to as "crosstalk". To alleviate crosstalk, the electrical interconnections must abide by fundamental rules of circuit routing so that they are set at a distance large enough to prevent neighboring signals from having any adverse effect on each other, which would reduce network performance.

Optical interconnections offer a solution to the difficulties affecting conventional electrical interconnections. For example, optical interconnections are not as susceptible to inductive or even capacitive coupling effects as electrical interconnections. In addition, optical interconnections offer increased bandwidth and substantial avoidance of electromagnetic interference. These potential advantages of optics become more important as the transmission rates increase.

Many communications network feature electronic switching devices to arbitrate the flow of information over the optical interconnections. Conventional electronic switching devices for optical signals are designed to include a hybrid optical-electrical semiconductor circuit employing photo detectors, electrical switches, optical modulator or lasers. The incoming optical signals are converted to electrical signals, which are amplified and switched for driving the lasers. One disadvantage associated with a conventional electronic switching device is that it provides less than optimal effectiveness in supporting high data transmission rates and bandwidth.

SUMMARY

In one embodiment, the present invention relates to an optical cross-connect switching system comprising (1) a switch subsystem, (2) a plurality of removable, input/output (I/O) port modules and (3) a switch control subsystem featuring servo modules. These units collectively operate to provide optical data paths for routing of light signals without conversion from optical to electrical domains and back to optical. Also, the optical cross-connect switching system is scalable because the I/O port modules, servo modules and even features of the switch subsystem may be removed without disruption in system operation.

The switch subsystem features at least two optical switch cores each including a number of optical switches such as micro-machined mirrors. The multiple optical switch cores provide redundancy in the event that optical switches for one of the optical switch cores are damaged or inoperable. These optical switch cores are removable without completely disrupting operation of the of the optical cross-connect switching system.

At each port, a removable I/O port module is configured with a splitter and at least two tap couplers. Normally passive in nature, the splitter is configured to produce at least two bridged light signals from an incoming light signal. The tap couplers are used to produce optical tap signals as well as outgoing light signals that are each routed to different optical switch cores. Configurable with a power level lesser than the outgoing light signals, the optical tap signals provide servo modules information for controlling the switch subsystem and monitoring performance variances in the optical data paths. Moreover, each port of an I/O port module includes an optical switch for selectively routing one of the light signals received from the optical switch cores during output operations.

A servo module includes a servo mirror control module and an optical detector module. The servo mirror control module is configured to adjust an optical path of a light signal from a source to a destination. Thus, the monitoring is not performed in the optical data path. The optical detector module, communicatively and removably coupled to the servo mirror control module, monitors a power level of the light signal to determine whether to adjust the optical path. Moreover, the optical detector module includes a laser to inject a substitute light signal into the optical path. The substitute light signal may be within the same wavelength range as the light signal.

Multiple servo modules are in communication with each other through a servo control module and multiple servo control modules are in communication with each other through network control modules.

Other aspects and features of the present invention will become apparent to those ordinarily skilled in the art upon

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a scalable, optical cross-connect switching system. The described embodiments should not limit the scope of the present invention, but rather are intended to provide a thorough understanding of the present invention. Certain well-known circuits are not set forth in detail in order to avoid unnecessarily obscuring the present invention.

In the following description, certain terminology is used to describe various features of the present invention. For example, a "module" includes a substrate normally formed with any type of material or materials upon which components can be attached such as a printed circuit board or a daughter card for example. Examples of a "component" include an optical switch, a processing unit (e.g., Field Programmable Gate Array "FPGA", digital signal processor, general microprocessor, application specific integrated circuit "ASIC", etc.), splitters and the like. A "splitter" is an optical component that performs a bridging operation on an input light signal by splitting that light signal into two or more output light signals. Each module features one or more interfaces to transport information over a link. A "link" is broadly defined as one or more physical or virtual information-carrying mediums that establish a communication pathway such as, for example, optical fiber, electrical wire, cable, bus traces, wireless channels and the like. "Information" can be voice, data, address, and/or control in any representative signaling format such as light signals (e.g., light pulses or photons).

I. General Architectural Overview

Figure 1:
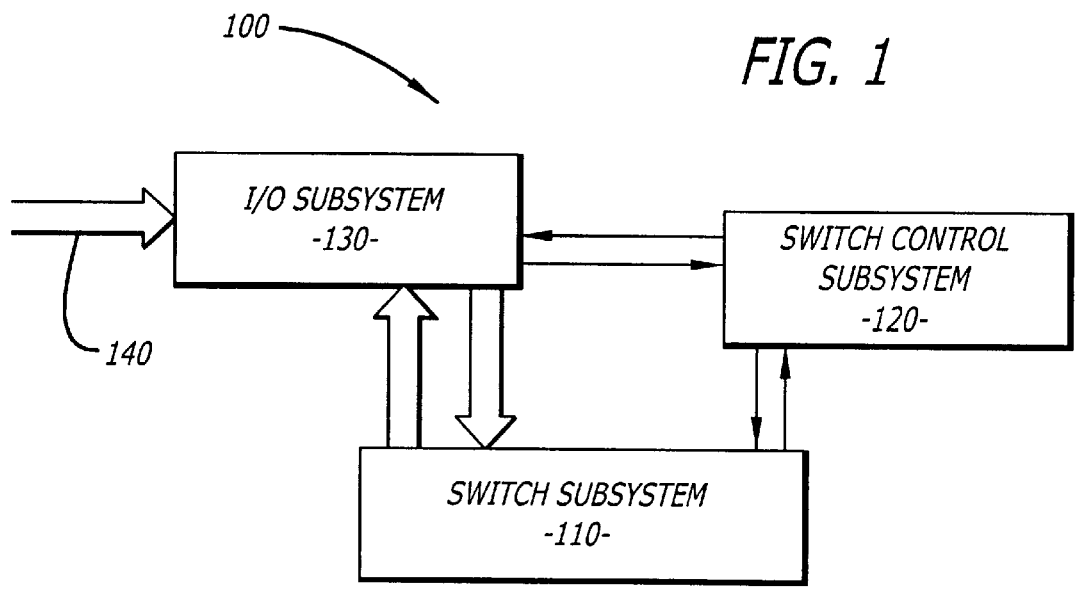
FIG. 1 is a simplified overview of an exemplary embodiment of an optical cross-connect switching system.

Referring to FIG. 1, an exemplary embodiment of a simplified overview of an optical cross-connect switching system 100 is shown. Herein, the optical cross-connect switching system 100 comprises three basic units: a switch subsystem 110, a switch control subsystem 120 and an input/output (I/O) subsystem 130. In one embodiment, the modular architecture of the switch subsystem 110, by a method of having replaceable optical switch cores, provides for switch subsystem maintenance in the event of failure within the switch subsystem 110. It is conceivable that further modularity could be achieved by having replaceable subsections within, thus providing for switch matrix maintenance in the event of failure within a switch matrix itself. The modular architecture of both the switch control subsystem 120 and the I/O subsystem 130, each handling a small number of I/O ports in the system 100, provides scalability to the optical cross-connect switching system 100. Thus, additional I/O ports may be subsequently added to the optical cross-connect switching system 100 by adding or removing input/output (I/O) port modules (described below).

The switch subsystem 110 includes optical switches for routing light signals. In one embodiment, the optical switches forming the switch subsystem 110 are micro-machined mirrors; however, it is contemplated that other switch fabrics may be used such as liquid crystal technology. The I/O subsystem 130 receives external light signals 140 and transfers these signals to the switch subsystem 110. The switch control subsystem 120 controls the configuration of the switch subsystem 110 (e.g., mirror orientation) and performs certain monitoring functions. The interconnectivity between the switch subsystem 110, the switch control subsystem 120 and the I/O subsystem 130 includes redundancy so that no equipment failures would cause complete disablement of the system 100.

Figure 2:
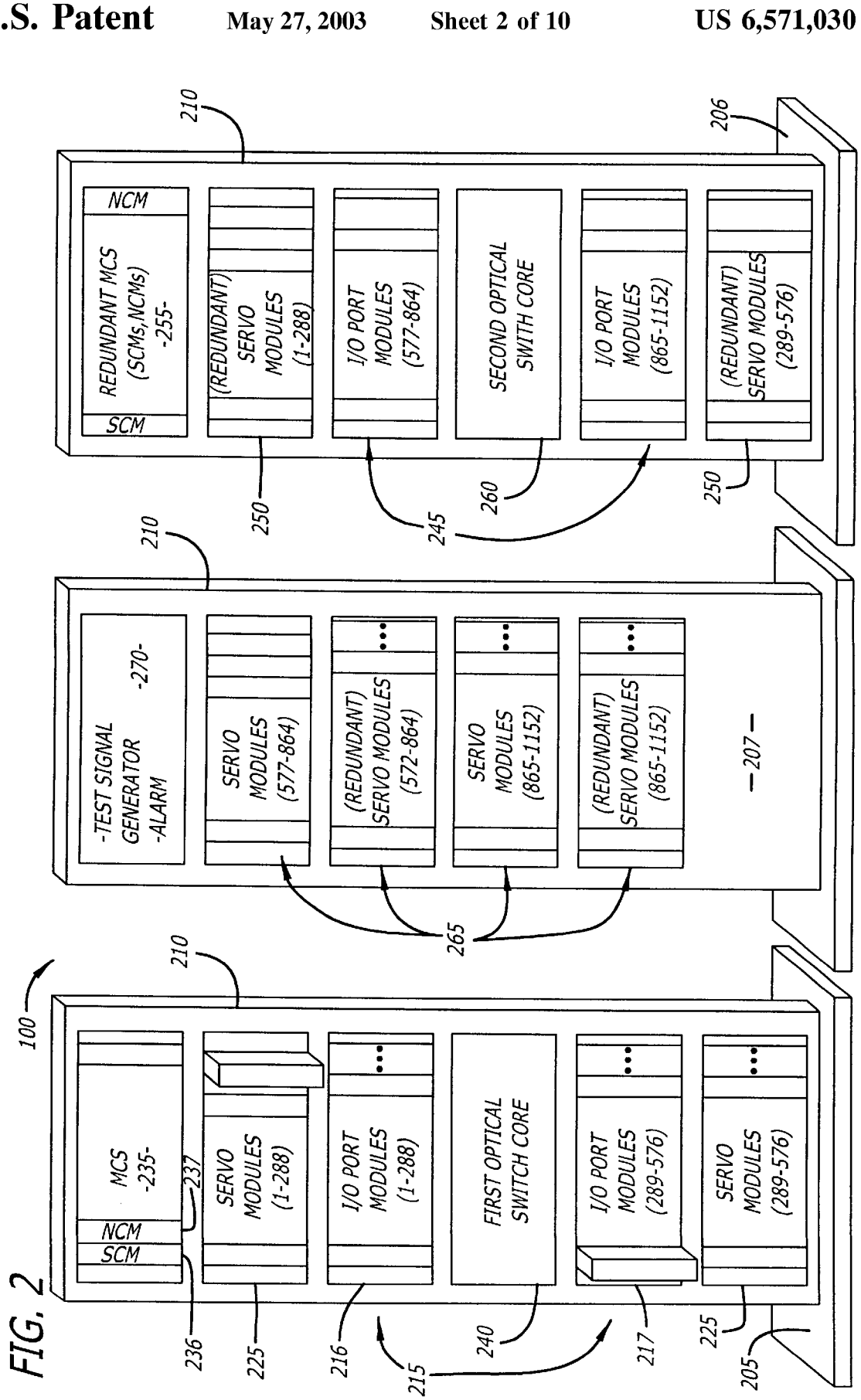
FIG. 2 is a first exemplary embodiment of an optical cross-connect switching system of FIG. 1.

Referring now to FIG. 2, a first exemplary embodiment of an optical cross-connect switching system 100 is shown. In general, the optical cross-connect switching system 100 is a matrix-based optical cross-connect with associated I/O port modules. More specifically, the optical cross-connect switching system 100 is collectively formed by a plurality of platforms 205, 206 and 207 in communication with each other, although the implementation of the switching system 100 as a single platform is another embodiment. Herein, each platform 205, 206 and 207 includes a frame 210 (e.g., a rack) that physically supports I/O port modules forming the I/O subsystem 130 as well as servo modules, servo control modules and/or network control modules of the switch control subsystem 120. The modules are arranged either horizontally or vertically within each platform 205, 206 and 207 and can be individually removed or installed without interfering with immediately adjacent modules. In addition, the frame 210 may also physically support one or more optical switch cores, which may also generally be referred to as "switch fabric," of the switch subsystem 110.

As shown in this embodiment, the first platform 205 comprises (i) a plurality of I/O port modules 215 associated with the I/O subsystem 130 of FIG. 1, (ii) a plurality of servo modules 225 and a management control subsystem (MCS)

235 associated with switch control subsystem 120 of FIG. 1, and (iii) a first (primary) optical switch core 240 associated with switch subsystem 110 of FIG. 1. Similarly, the second platform 206 comprises a plurality of additional I/O port modules 245, a plurality of (redundant) servo modules 250, a management control subsystem 255, and a second (redundant) optical switch core 260. The third platform 207 comprises a plurality of servo modules 265 that control various mirrors of the first and second optical switch cores 240 and 260, which correspond to additional ports associated with I/O port modules 245. Additionally, a light path test signal generator(s), a light path signal monitor(s), circuit breakers and/or alarm visual indication 270 may be located within the third platform 207. For clarity, the elements forming the first platform 205 are described since these elements may be found in the second and/or third platforms 206 and 207.

Figure 3:
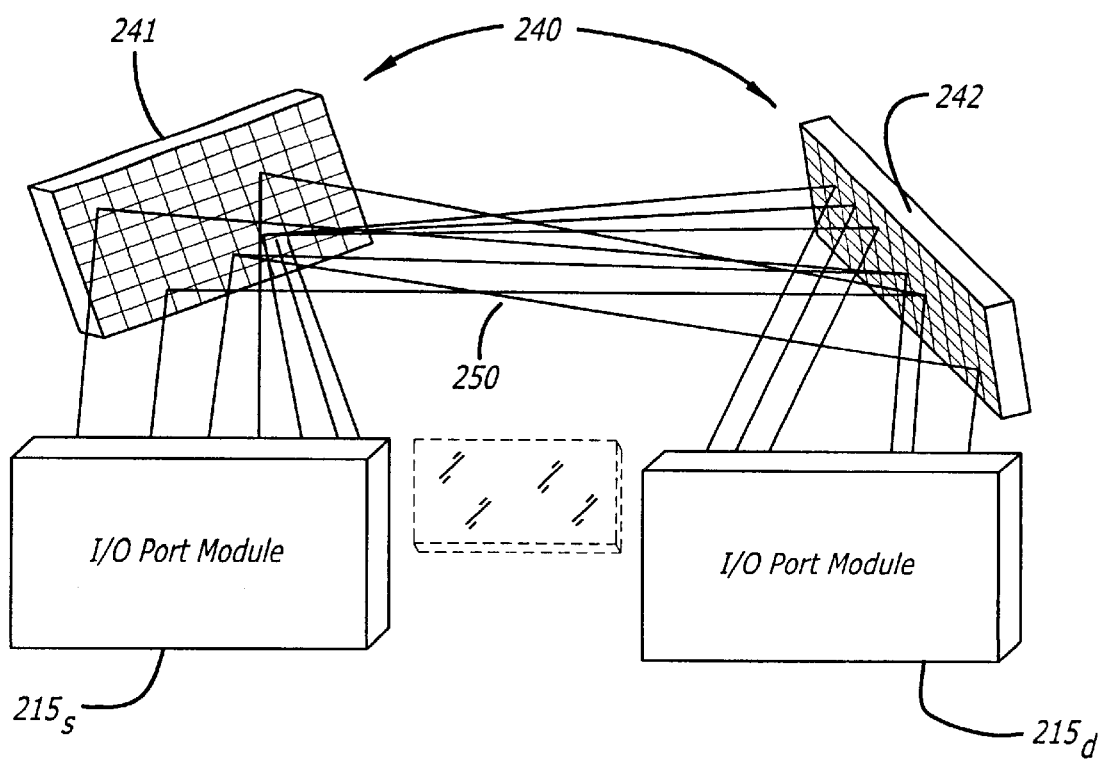
FIG. 3 is an exemplary embodiment of the optical fiber switch matrices forming an optical switch core of FIG. 2.
Figure 4:
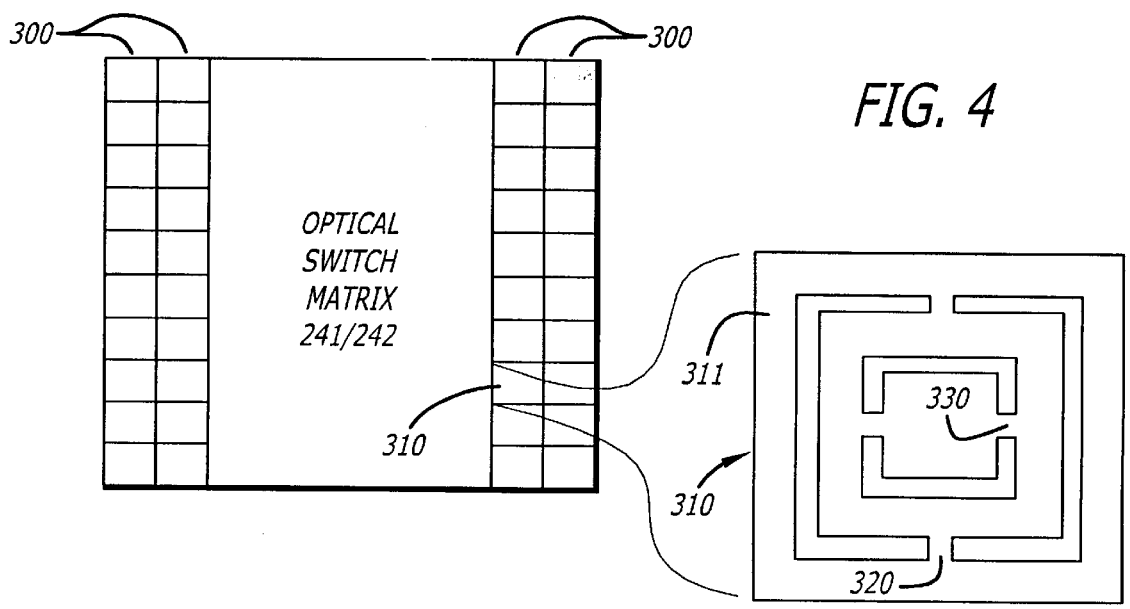
FIG. 4 is an exemplary embodiment of mirror arrays forming an optical switch matrix of FIG. 3.

As shown in both FIGS. 2–4, the first optical switch core 240 includes a first optical switch matrix 241 and a second optical switch matrix 242. These matrices 241 and 242 are collectively positioned to route light signals 250 between a port of a source I/O port module $215_s$ ("s" is a positive whole number) and a port of a destination I/O port module $215_d$ ("d" is a positive whole number), both modules located in any of the platforms 205, 206 and 207 as shown in detail in FIG. 3. Although a two-bounce routing technique is shown, it is contemplated that a three-bounce routing technique may be used in which the "second bounce" mirror, as optionally shown through dashed line, is positioned to assist in routing light signals from one optical switch matrix to another.

As shown in FIG. 4, one embodiment for each of the optical switch matrices 241 and 242 includes multiple arrays 300 of micro-machined mirrors. Each mirror (e.g., mirror 310) features a mirrored surface 311 and torsional flexures 320 and 330 that enable the mirror 310 to adjust its physical orientation to reflect incoming light signals in any selected direction. Herein, both the first and second optical switch matrices 241 and 242 include Q micro-machined mirrors, where "Q" is less than or equal to the maximum number of I/O ports that can be supported by the optical cross-connect switching system 100. For this embodiment, "Q" is greater than or equal to 64 but less than or equal to 1152 ($64 \leq Q \leq 1152$). However, the present invention is not limited to any maximum number of mirrors or I/O ports. It is contemplated, however, that the number of mirrors employed within the first and second optical switch matrices 241 and 242 may differ.

Figure 6:
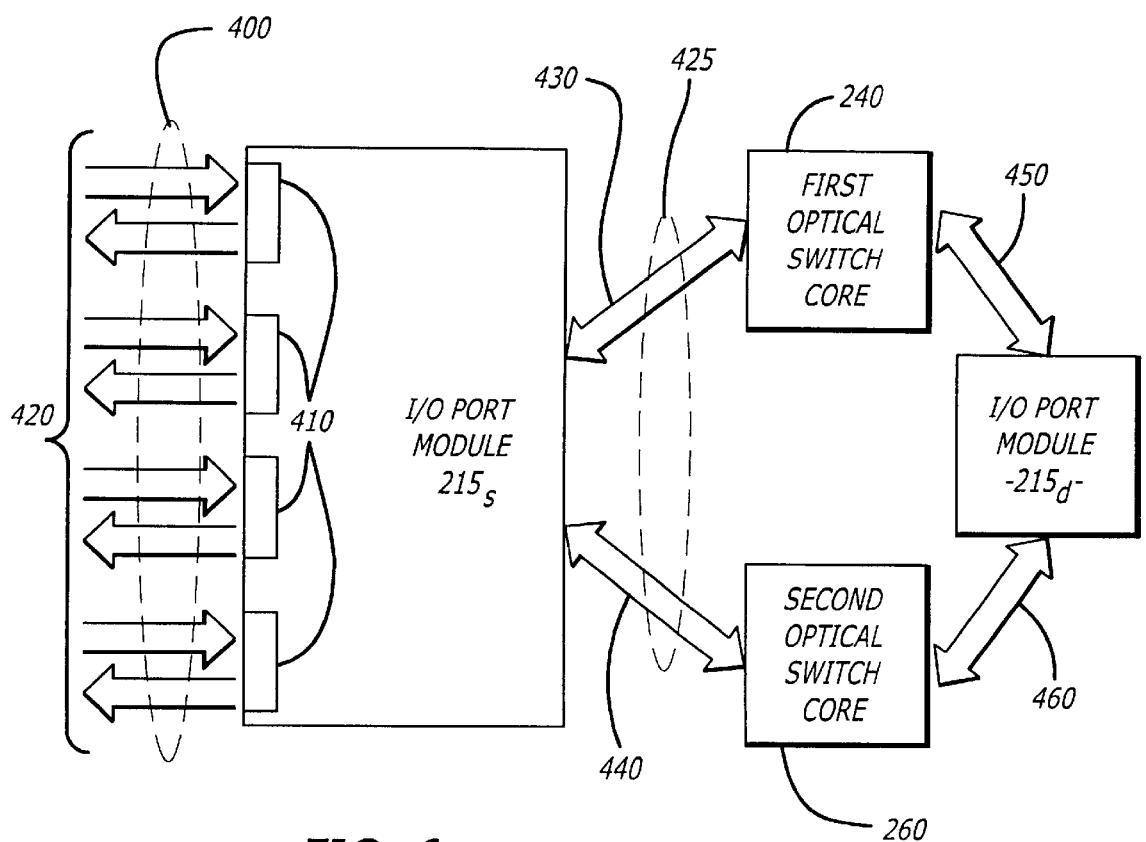
FIG. 6 is an exemplary embodiment of a data path for the transfer of light between I/O port modules and multiple optical switch cores of FIG. 2.
Figure 5:
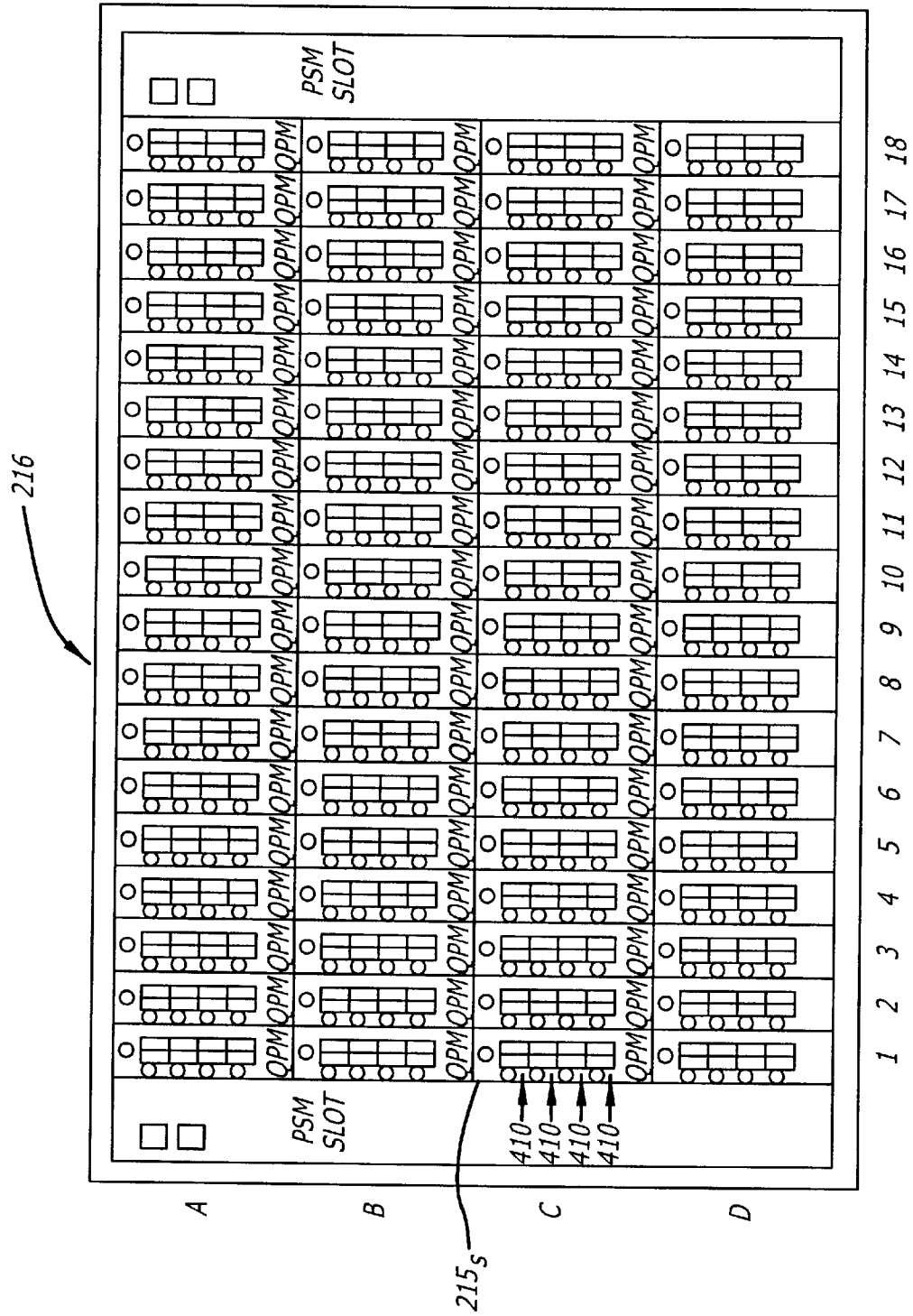
FIG. 5 is an exemplary embodiment of an I/O subsystem featuring a plurality of I/O port modules.

As generally shown in FIGS. 2, 5 and 6, the plurality of I/O port modules 215 features two groups 216 and 217 of I/O port modules. Each group, such as group 216 or 217 for instance, includes up to seventy-two (72) quad-port I/O port modules as shown in FIG. 5 that receive power from one or more power supply modules denoted herein as "PSM". The components forming an I/O port module is described below and shown in FIGS. 8 and 9. Thus, each I/O port module, such as I/O port module $215_s$ for example, features an external interface 400 for a plurality of I/O ports 410 (e.g., four I/O ports). An I/O port 410 features a duplex socket that is adapted to receive a duplex pair of optical fiber links, one optical fiber link routes a light signal to the I/O port 410 while the other routes light signals from the I/O port 410. This support bi-directional optical connections. There is a small percentage (e.g., less than 15%) of these I/O ports, however, that may be assigned as test access ports as described below.

Moreover, as shown in FIG. 6, upon receiving an incoming light signal over an optical fiber link 420, the I/O port module $215_s$ performs a bridging operation by splitting the incoming light signal into multiple (two or more) bridged light signals for routing to the first and second optical switch cores 240 and 260. The bridged light signals are routed through an internal optical interface 425 featuring optical fiber ribbon links 430 and 440. For this embodiment, the "optical fiber ribbon links" are ribbon cables having multiple optical fiber lines (e.g., two lines from each I/O port). The first optical switch core 240 provides a primary optical path. The second optical switch core 260 provides a redundant optical path in the event the first optical switch core 240 is not operating properly. The optical switch cores 240 and 260 route the bridged light signals to a selected port of a destination I/O port module (e.g., I/O port module $215_d$) via optical fiber ribbon links 450 and 460.

Figure 7:
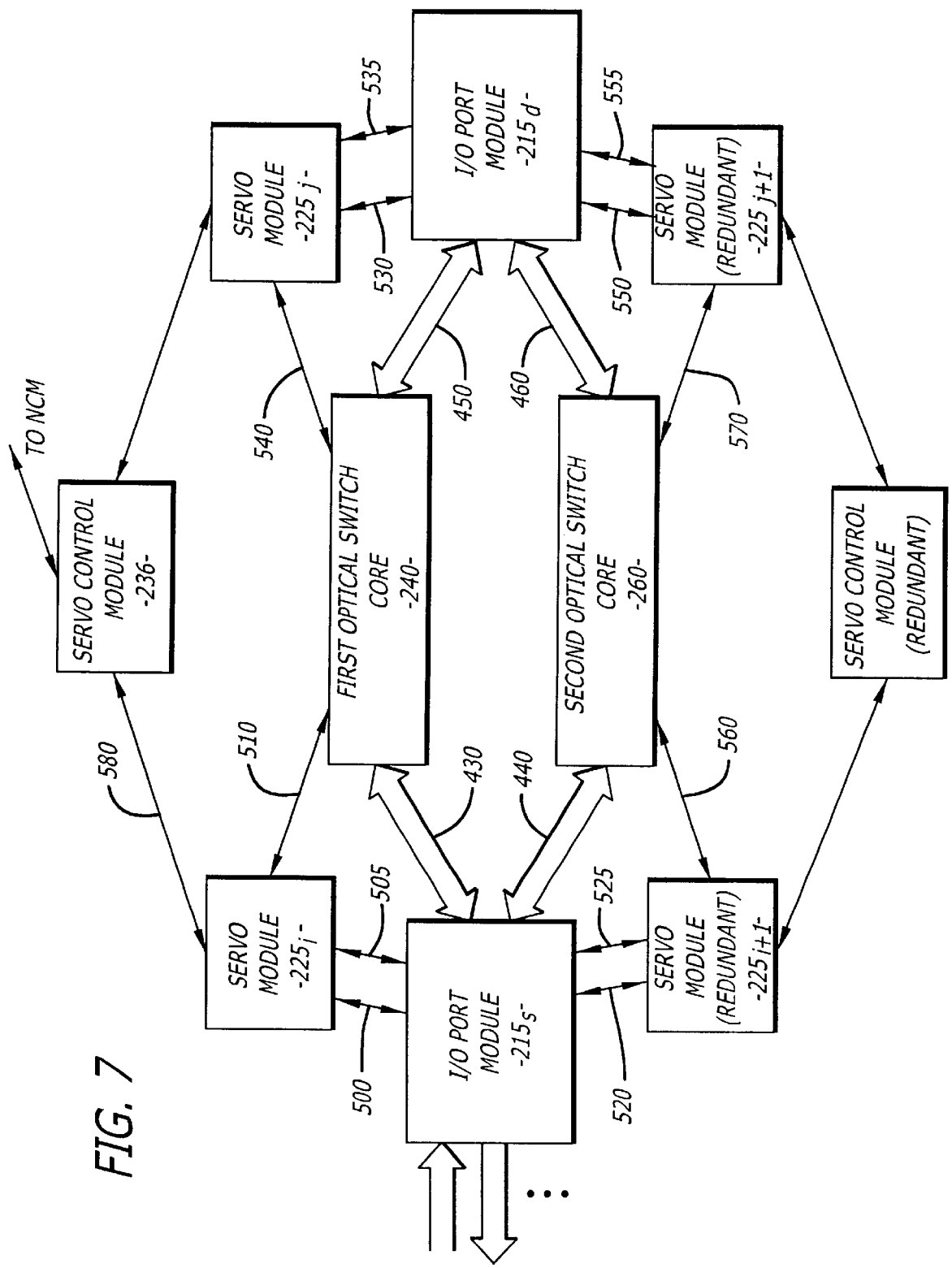
FIG. 7 is an exemplary embodiment of a control path featuring the interconnections between the I/O port module and servo modules.

Upon receiving light signals from both the first and second optical switch cores 240 and 260, the I/O port module $215_s$ provides small percentage optical tap signals of the received light paths to the respective servo modules, which in turn determine light signal quality. The respective servo modules will convey light signal quality for each respective light path to the I/O port module, using a digital protocol over an electrical communication link 505 to the I/O port module as shown in FIG. 7. The I/O port module $215_s$ will in turn, determine (i.e. select) which light signal has the higher signal quality and outputs that signal via interface 400. In most cases, the signal quality of the two light paths presented to the I/O port module will be of the same signal quality and may have a relatively low optical loss of approximately seven decibels (7 dB) or less.

Referring now to FIGS. 2 and 7, each servo module 225 is configured to receive optical tap signals from one or more I/O port modules. Herein, servo module $225_i$ is configured to receive optical tap signals via link 500 from I/O port module $215_s$. These optical tap signals provide feedback to indicate a percentage of the bridged light signals and also allow for light to be injected under certain conditions. In response to receiving optical tap signals via link 500, the servo module $225_i$ provides mirror control signals over link 510 to the first optical switch core 240. The mirror control signals are routed via a unique communication path to an optical switch (e.g., a micro-machined mirror) and are associated with the port of the I/O port module $215_s$ through which the incoming light signal was routed. The mirror control signals are used for proper adjustment of the physical orientation of the mirror.

The I/O port module $225_d$ provides optical tap signals over link 530 to servo module $225_j$. In response to receiving the optical tap signals from I/O port module $225_d$, the servo module $225_j$ provides mirror control signals via link 540 to the first optical switch core 240. The mirror control signals are routed via a unique communication path to a micro-machined mirror associated with a selected port of the I/O port module $215_d$ from which the light signal would be output. Herein, sensing the optical tap (feedback) signals, the servo module $225_j$ determines the light signal quality and conveys light signal quality information for each light path using a digital protocol over (electrical) link 535. Thereafter, the I/O port module 215d chooses the selected port (i.e. port having the best light signal quality).

Collectively, the optical tap signals, mirror control signals and light signal quality information, which are routed over links 500, 510, 530, 540, 505 and 535, are used by servo modules $225_i$ and $225_j$ for adjustment of the physical orientation of mirrors to make a connection between I/O port module $215_s$ and $225_d$.

Additionally, I/O port modules $215_s$ and $225_d$ also transfer optical tap signals via links 520 and 550, respectively.

Similar to the above description, these optical tap signals establish the redundant optical path by altering the physical orientation of one or more micro-machined mirrors of the second optical switch core 260 using mirror control signals over links 560 and 570 and light signal quality information via links 525 and 555.

Figure 11:
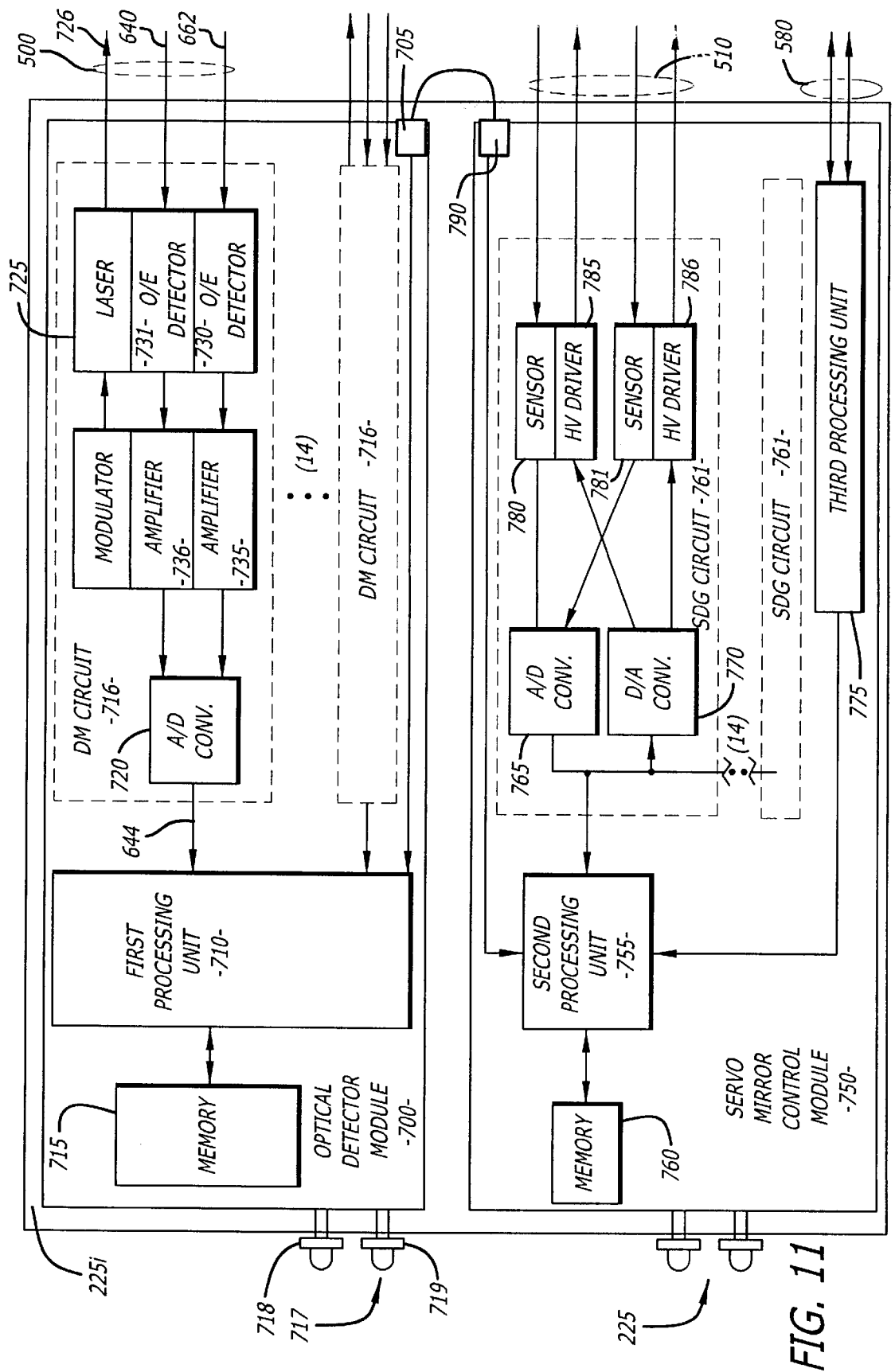
FIG. 11 is an exemplary embodiment of a servo module of the optical cross-connect switching system of FIG. 1.

In the event that no optical power is presented to the I/O port module $215_s$, a substitute light signal may be injected from the servo module $225_i$ via link 500. An alignment laser may be used as shown in FIG. 11 described below. This process of light substitution allows for connection establishment and verification when no input light is present to the I/O port module $215_s$. The substitute light source can be within the same wavelength range (e.g. 1100 nanometers "nm"–1700 nm) as the allowed input light signal range. In one embodiment, the light source or method of injection would be chosen to not interfere with attached equipment's select operational wavelength range. Choosing a different wavelength source on the servo module and/or a wavelength specific splitter and/or filter on the I/O port module could do this particular embodiment.

The management control subsystem 235 (see FIG. 2) enables communications between two or more servo modules placed within the same or different platforms. The management control subsystem 235 includes at least one servo control module 236 and an optional network control module 238. In one embodiment, the servo control module (SCM) 236 ensures communication between at least servo modules $225_i$ and $225_j$ that control mirrors associated with the first optical switch core 240. The network control module (NCM) 238 manages the execution of connection configurations for the whole cross-connect switching system and ensures communications between multiple servo control modules 236 and 237. The same architecture is used to control optical switches within the second optical switch core 260 as shown.

II. General Architecture of the I/O Port Modules

Figure 8:
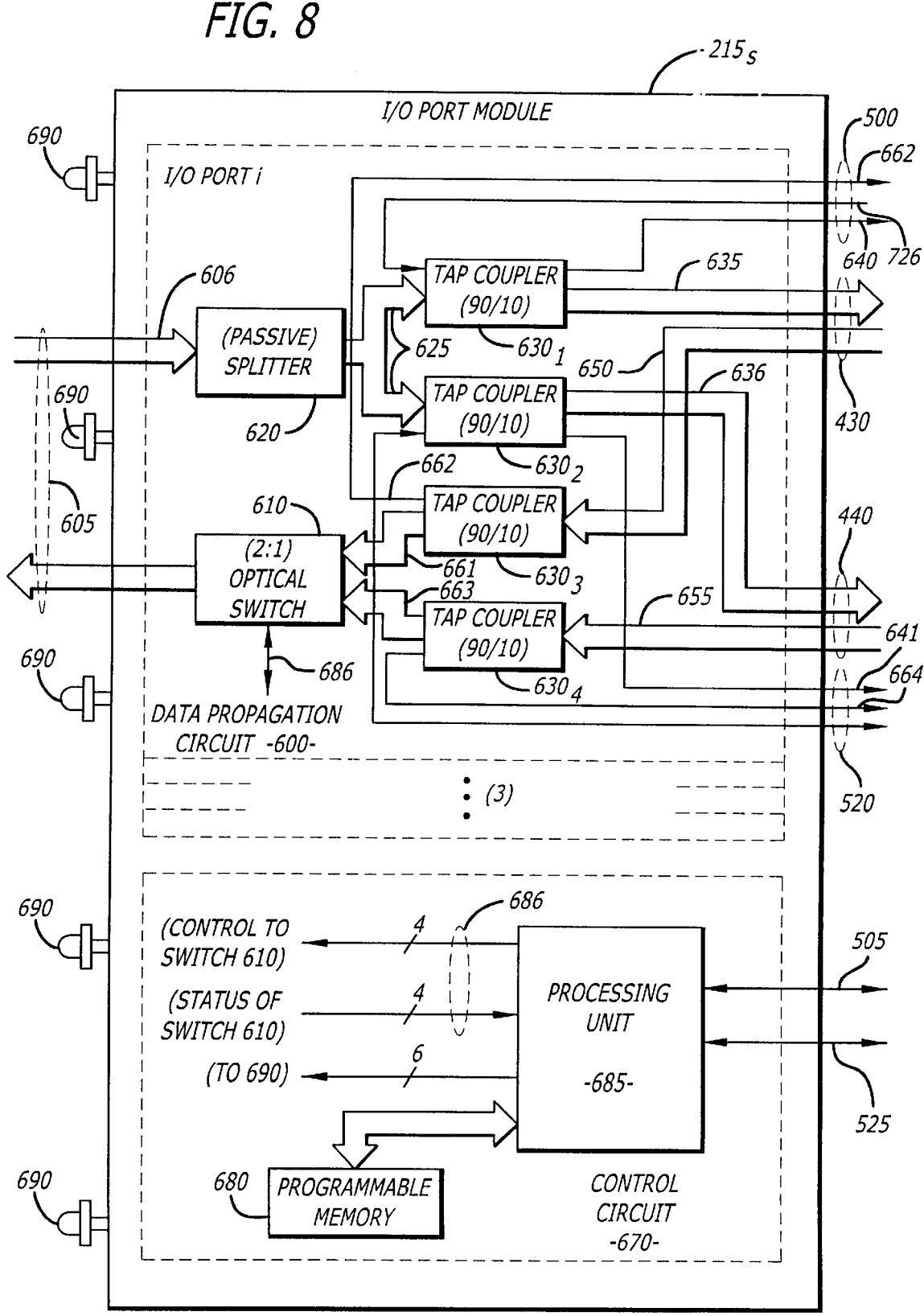
FIG. 8 is an exemplary embodiment of the I/O port module of FIGS. 6 and 7 illustrating a data propagation circuit and a control circuit.
Figure 9:
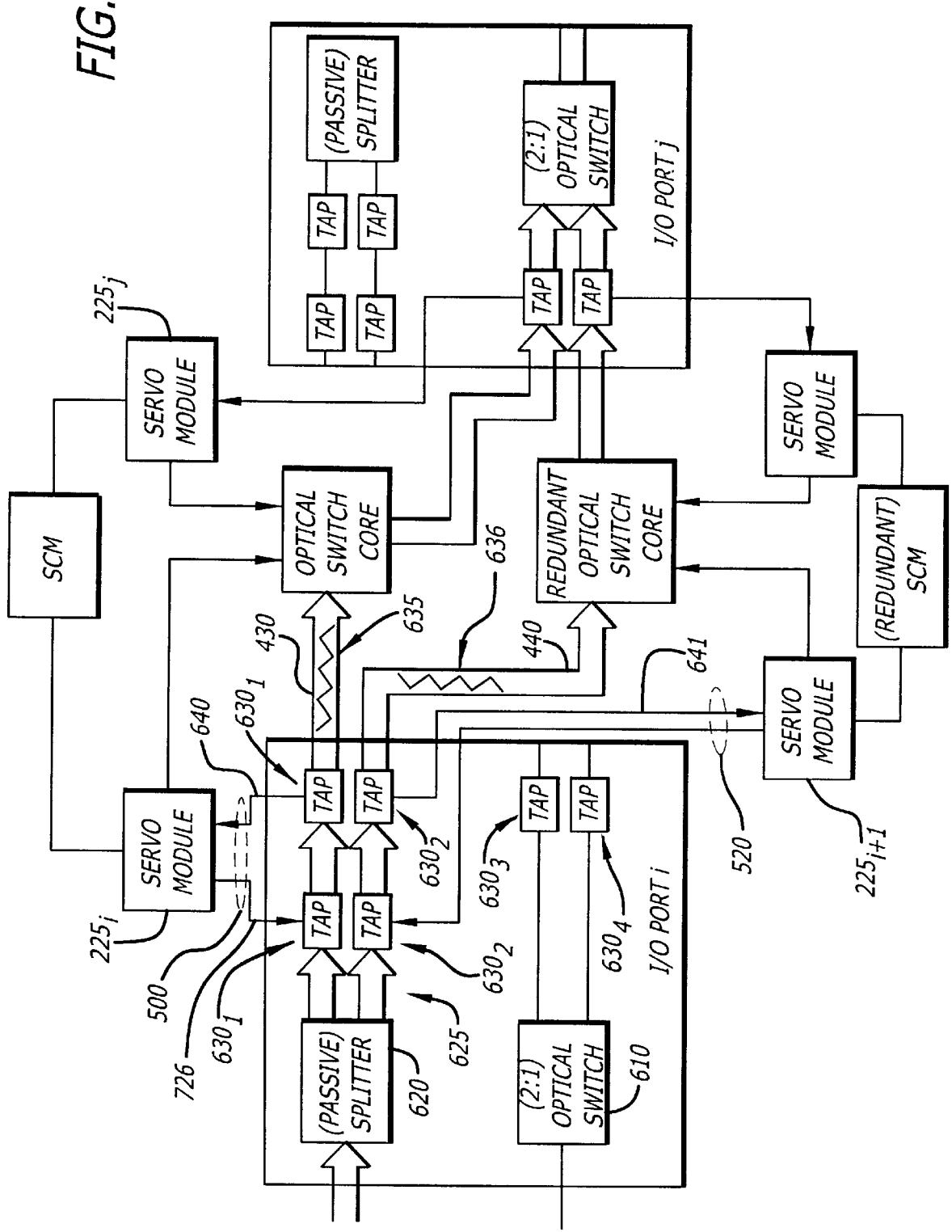
FIG. 9 is an exemplary embodiment of multiple ports of I/O modules in communication with optical switches controlled by servo modules.

Referring now to FIGS. 8 and 9, an exemplary embodiment of an I/O port module (e.g., I/O port module $215_s$) and its communications over optical switch cores 240 and 260 is shown. I/O port module $215_s$ includes a data propagation circuit 600 for each I/O port and a control circuit 670. Thus, in the event that the I/O port module $215_s$ is configured with four I/O ports, four data propagation circuits are implemented on the I/O port module $215_s$ as represented. Only the data propagation circuit 600 for one of the I/O ports of I/O port module $215_s$ (e.g., $i^{th}$ I/O port) is shown in detail for clarity sake.

In one embodiment, the data propagation circuit 600 comprises an optical switch 610, a (passive) splitter 620 and a plurality of tap couplers $630_1$–$630_4$. The plurality of tap couplers $630_1$–$630_4$ correspond to the pairs of optical fibers found in optical fibber ribbon links 430 and 440. The control circuit 670 comprises a programmable memory 680, a processing unit 685 and status identification components 690.

As shown, each port of the I/O port module $215_s$ supports full-duplex communications. Thus, an incoming light signal 606 received over port 605 is routed to the splitter 620. The splitter 620 effectively performs a bridging operation by splitting the incoming light signal 606 into bridged light signals 625, which collectively have the same power level (energy) as the light signal 606. In one embodiment, when the splitter 620 is a 50/50 splitter, the bridged light signals 625 have equal power levels. However, it is contemplated that splitter 620 may produce bridged light signals 625 having disproportionate power levels.

The bridged light signals 625 are routed through the tap couplers $630_1$ and $630_2$. Attached to servo module $225_i$ and servo module $225_{i+1}$ via optical tap links 500 and 520, the tap couplers $630_1$ and $630_2$ are used to monitor the power level of light signals 635 and 636 propagating through optical fiber ribbon links 430 and 440 (referred to as "outgoing light signals"). This enables the servo modules $225_i$ and $225_{i+1}$ to verify the connectivity of the splitter 620 to optical fiber ribbon links 430 and 440 and to detect unacceptable variances in optical performance of the light signal. As shown for this embodiment, the tap couplers $630_1$ and $630_2$ may separate the bridged light signals into signals having disproportionate power levels in order to maximize the power levels of the outgoing light signals propagating through optical fiber ribbon links 430 and 440. For example, where the tap couplers $630_1$ and $630_2$ may operate as 90/10 splitters, the outgoing light signals 635 and 636 have ninety (90%) of the total power level of the bridged light signal while the tap optical signals 640 and 641 have only ten percent (10%).

Referring to FIG. 8, tap couplers $630_3$ and $630_4$ are configured to receive incoming light signal 650 and 655 via optical fiber ribbon links 430 and 440, respectively. The tap couplers $630_3$ and $630_4$ effectively separate the light signals 650 and 655 into corresponding pairs of light signals having disproportionate power levels (e.g., signals 661, 662 and 663, 664). Signals 662 and 664 having the lower power level are provided to the servo module $225_i$ and servo module $225_{i+1}$ via links 500 and 520 for monitoring the power levels of the light signals 661 and 663, without the light signals 661 and 663 experiencing substantial signal degradation. The signals 662 and 664 may be light signals that undergo O/E conversion at the I/O port module $215_s$ or at the servo modules $225_i$ and $225_{i+1}$ as shown in FIG. 11. The tap couplers $630_3$ and $630_4$ are shown as 90/10 splitters; however, tap couplers $630_3$ and $630_4$ may be any selected ratio, including 50/50.

The light signals 661 and 663 are routed to the optical switch 610 of a destined I/O port. The control circuit 650 on the I/O port module $215_s$ determines which of the pair of light signals 661 and 663 has the best signal quality based on conveyed light signal quality information from the servo modules via links 505 and 525 as briefly described below. Parameters used to determine light signal quality include measured optical signal intensity/power, extinction ratio, and the like. The light signal quality information to the I/O port module may be conveyed as failed due to the servo module service operations, high bit error rate, an external light path has failed, and the like. The light signal 661 or 663 with the best signal quality is output through the I/O port 605. Of course, it is contemplated that the light signal output operations described for I/O port i are applicable to I/O port j as shown.

Figure 10:
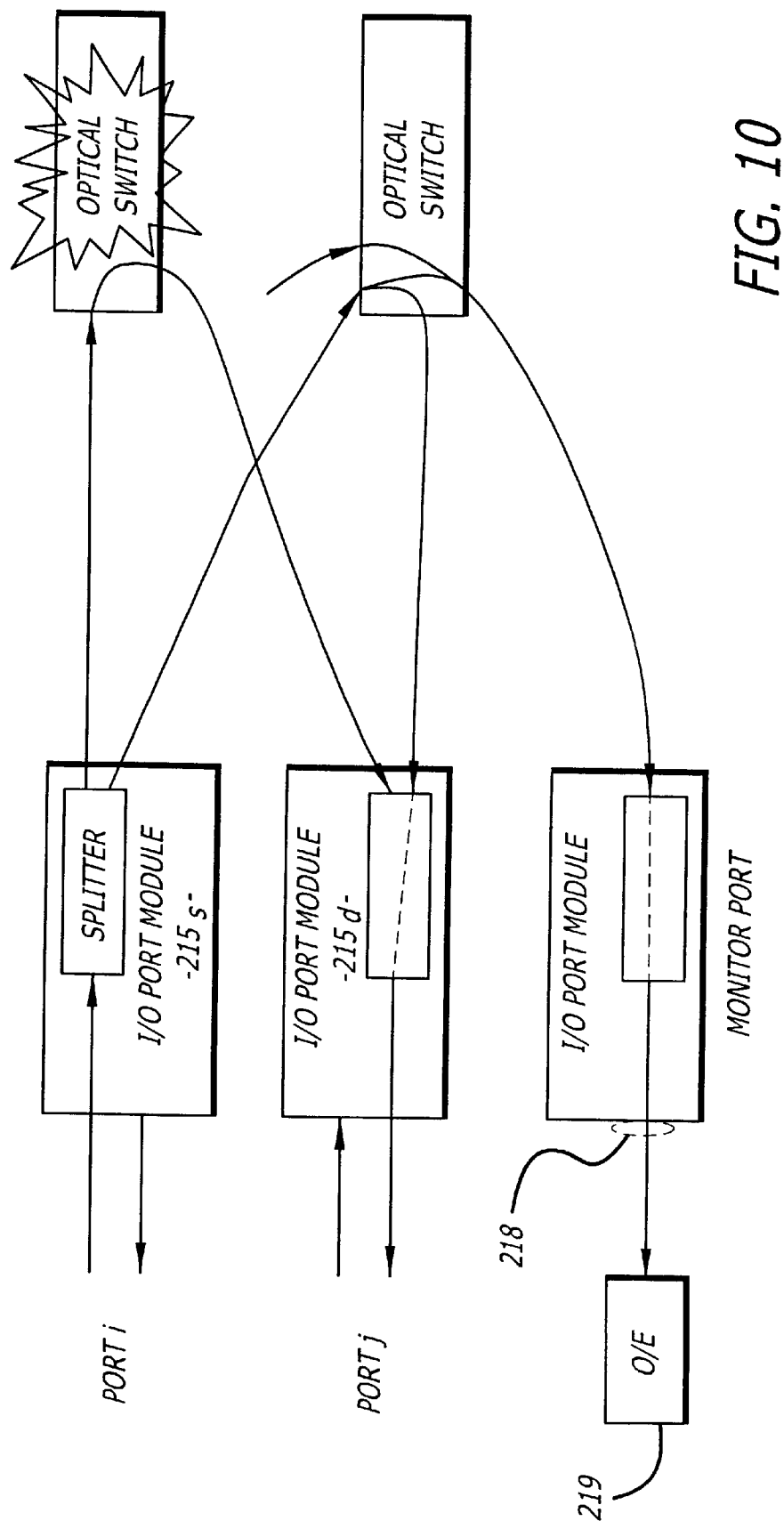
FIG. 10 is an exemplary embodiment of an I/O port configured as a test access port.

It is contemplated that an I/O port of the I/O port module $215_s$ may be configured as a test access port. A "test access port" is an I/O port that is used for monitoring light signals routed through another port. Normally, the test access port receives a portion of the power level of a light signal routed through a selected optical switch (e.g., micro-machined mirror). For example, as shown in FIG. 10, an I/O port 218 of the I/O port module $215_s$ is configured for coupling with a monitoring device 219 (e.g., a bit error rate "BER" monitor in combination with an optical-electrical "O/E" converter, etc.) to monitor a power level of a light signal routed to the $i^{th}$ I/O port from an optical switch.

Referring back to FIG. 8, the control circuit 670 comprises the programmable memory 680 in communication with the processing unit 685 (e.g., FPGA). The programmable memory 680 contains software and other information used by the processing unit 685 to provide selection of the best quality signal based on digital electrical signaling from servo module $225_i$ and servo module $225_{i+1}$ over links 505 and 525, respectively. Also, programmable memory 680 includes information used by the processing unit 685 to control the state of the status identification components 690 (e.g., light emitting diodes "LEDs"). The state of the status identification components 690 identifies (1) whether each I/O port is operational and/or (2) whether the I/O port module is operational. The processing unit 685 is further in communications with optical switches of each data propagation circuit employed in the I/O port module $215_s$ in order to receive switch status signals and provide switch control signals. As shown for clarity, processing unit 685 provides optical switch 610 with switch control signals for receiving switch status signals and selecting either light signal 661 or light signal 663.

III. General Architecture of the Servo Modules

Referring now to FIG. 11, an exemplary embodiment of the servo module (e.g., servo module $225_i$) is shown. In one embodiment, the servo module $225_i$ comprises two separate modules in communication over connectors 705 and 790. These separate modules are referred to as an "optical detector module" 700 and a "servo mirror control module" 750.

The optical detector module 700 comprises a first processing unit 710, memory 715, a plurality of detection/modulation (DM) circuits 716 and status identification components 717. As shown, the optical detector module 700 features sixteen (16) DM circuits 716 to support four (4) quad-port I/O port modules. Each DM circuit 716 includes an analog-to-digital (A/D) converter 720, a laser 725, optical-electrical (O/E) detectors 730 and 731, and optional amplifiers 735 and 736.

The servo mirror control module 750 comprises a second processing unit 755, a memory 760, a plurality of mirror signal detection and generation (SDG) circuits 761, a third processing unit 775 and status identification components 795. The SDG circuits 761 correspond in number to the DM circuits 716 of the optical detector module 700. Each SDG circuit 761 features an A/D converter 765, a digital-to-analog (D/A) converter 770, hinge position sensors 780–781 and high voltage (HV) mirror drivers 785–786.

As shown in FIG. 11, the optical detector module 700 is removably coupled to the servo mirror control module 750. This allows the optical detector module 700 to be "hot swapped" from a backplane, which features connectors 705 and 790 connecting the optical detector module 700 to the servo mirror control module 750, without disrupting the servo mirror control module's 750 ability to hold the mirrors in their existing positions for an extended period of time. This "hot swapping" of the optical detector module 700 allows for repair or upgrade of the optical detector module 700. Optical detector module 700 receives optical tap (feedback) signals 640 and 662 from one or more I/O port modules (e.g., I/O port module $215_s$ via link 500) and can transmit optical control signals 726 from the laser 725 for alignment of light signals transferred between two I/O port modules. The optical tap signal 640 is based on an input light signal that is routed to the switch fabric.

More specifically, with respect to servo module $225_i$, the O/E detectors 730 and 731 are coupled to tap couplers $630_1$ and $630_3$ of FIGS. 8–9. More specifically, the O/E detectors 730 and 731 are configured to detect incoming, optical tap signals 640 and 662, convert the optical tap signals 640 and 662 into corresponding electrical control signals measuring a power level of the outgoing light signal, and optionally route the electrical control signals to corresponding amplifiers 735 and 736. The (amplified) electrical control signals are provided to the A/D converter 720. The A/D converter 720 converts the electrical control signals into measured power sense signals 644 of a digital form. The measured power sense signals 644 are provided to the first processing unit 710.

Herein, the first processing unit 710 may perform a number of operations based on the electrical control signals such as threshold crossing, LOS integration, input/output power ratio analysis and the like. Software and other information necessary for performing these operations may be obtained from the memory 715 by the first processing unit 710. Herein, memory 715 can be non-volatile memory such as non-volatile random access memory, electrically erasable programmable read only memory (EEPROM) and the like.

The optical detector module 700 includes multiple status identification components 717 (e.g., light emitting diodes "LEDs"). A first LED 718 identifies whether any operational faults associated with the servo module $225_i$ have occurred. A second LED 719 indicates when the optical detector module 700 is in service.

Referring still to FIG. 11, in this embodiment, the servo mirror control module 750 comprises the second processing unit 755 that is coupled to both the first processing unit 710 and the third processing unit 775. For instance, in order to adjust the switch fabric in response to the measured power sense signals 644, the second processing unit 755 receives information representative of the measured power sense signals from the first processing unit 710 via connectors 705 and 790. The second processing unit 755 further receives information representative of measured power sense signals for the light signal at a targeted I/O port. This information is provided by the SCM 236 over link 580 via the third processing unit 775. This assists in reducing errors in adjusting the torsional flexures of the mirrors.

Upon receipt of these measured power readings, the second processing unit 755 controls a particular SDG circuit corresponding to a mirror associated with the I/O port over which the tapped light signal was routed. The control involves slight mirror orientation adjustments if the power level readings differ substantially.

In particular, a first hinge position sensor 780 senses a position of a mirror via link 510 from the first optical switch core 240. The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 785 and applied to a selected mirror of the first optical switch core in order to adjust the amount of torsional flexure along a first dimensional plane (e.g., X-axis). This is accomplished to minimize the loss experienced by the light signal.

A second hinge position sensor 781 senses a position of a mirror for the first optical switch core along a second dimensional plane (e.g., Y-axis). The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 786 and are applied to the selected mirror of the first optical switch core in order to adjust the amount of torsional flexure along the second dimensional plane. The specifics of the hinge position sensors 780 and 781 are described in a PCT application entitled "Micromachined Members Coupled for Relative Rotation By Torsional Flexure Hinges" (International Publication No. WO 00/13210) published on or around Mar. 9, 2000.

In another embodiment, when I/O port module $215_s$ is the destination of a light signal, the second processing unit 755 receives information representative of the measured power sense signals associated with the optical tap signal 662 that has been analyzed by the first processing unit 710. The optical tap signal 662 is based on an output light signal being routed from an I/O port. In this situation, the third processing unit 775 receives information associated with the measured power sense signals from a source I/O port as reported by SCM 236 over link 580.

IV. Redundant Architecture of the Optical Cross-Connect Switching System

Figure 12:
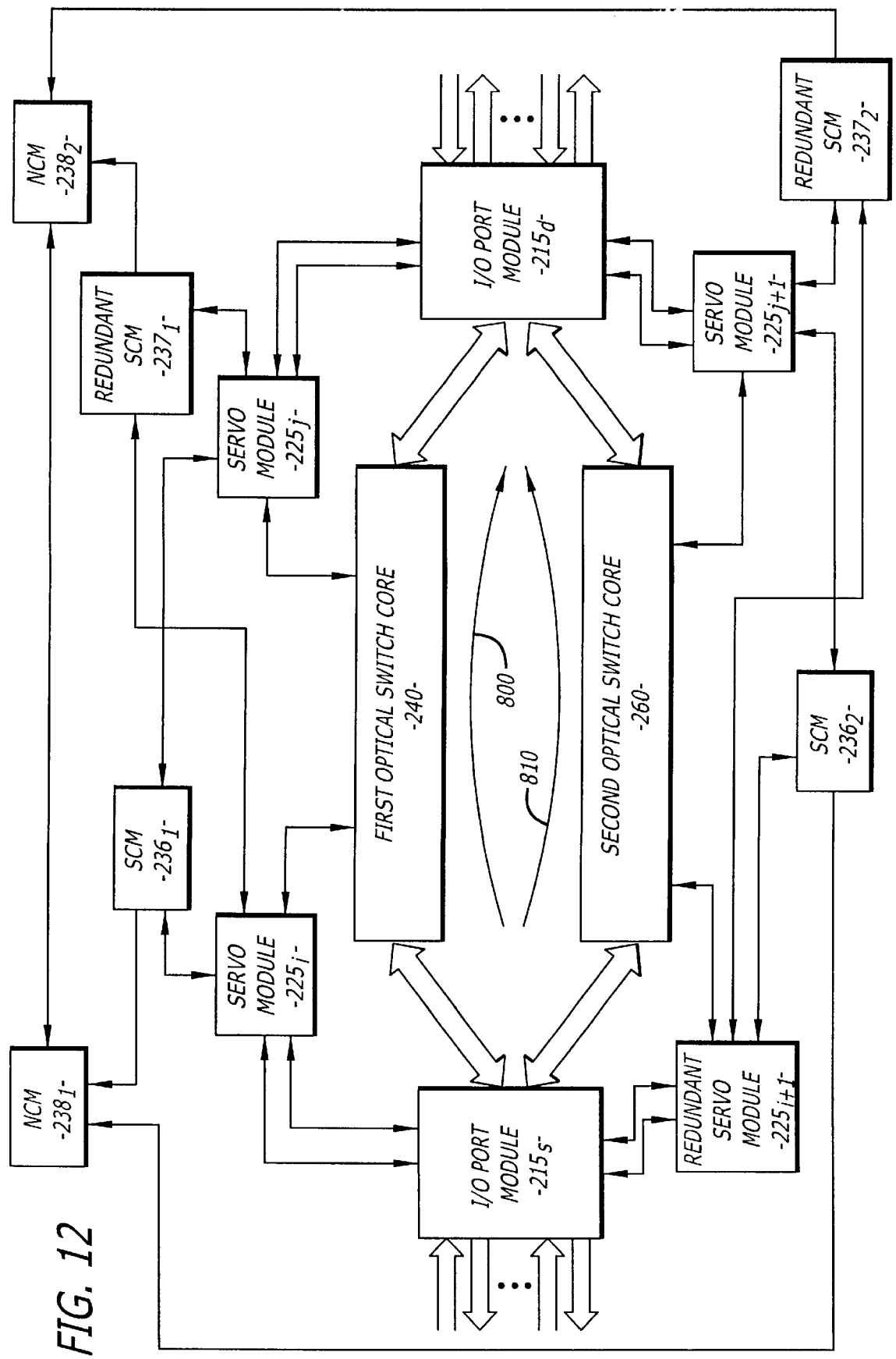
FIG. 12 is an exemplary block diagram of a redundant architecture of the optical cross-connect switching system of FIG. 1.

Referring now to FIG. 12, a block diagram of an alternative embodiment of the architecture of the optical cross-connect switching system of FIG. 1 is shown which includes redundant protection capabilities. Redundancy is desired in order to increase the reliability of such an optical cross-connect switching system. Aside from the I/O port modules, all other modules are duplicated to obtain the desired redundancy. Thus, it is necessary for light signals from a source I/O port module $215_s$ to be routed to a destination I/O port module $225_d$ through two optical paths, namely a primary optical path 800 using a first optical switch core 240 and a redundant optical path 810 using a second optical switch core 260.

With respect to the primary optical path 800, a servo module $225_i$ is connected to both the source I/O port module $215_s$ and the first optical switch matrix (not shown) of the first optical switch core 240. In particular, the servo module $225_i$ controls the physical orientation of a mirror of the first optical switch matrix that corresponds to the source I/O port module $215_s$. To establish and maintain the primary optical path 800 for the light signal, the servo module $225_i$ needs to communicate with other servo modules such as servo module $225_j$. Thus, a servo control module (SCM) is implemented to support such communications, possibly through a time-slot switching arrangement.

As shown, the SCMs $236_1$–$236_2$ are also duplicated so that each servo module 225 is connected to at least two SCMs $236_1$–$236_2$. Thus, in the event that the SCM $236_1$ fails, the primary optical path 800 remains intact because communications between the servo modules $225_i$ and $225_j$ are maintained via redundant SCM $237_1$. The transfer is accomplished by temporarily halting the adjustment of (i.e. freezing) the mirrors inside the first optical switch core 240 while control is transferred from SCM $236_1$ to SCM $237_1$. The SCMs $236_1$ and $237_1$ associated with the first optical switch core 240 are in communication via a network control modules (NCMs) $238_1$ and $238_2$ for example.

With respect to the redundant optical path 810, a servo module $225_{i+1}$ is connected to both the source I/O port module $215_s$ and one or more mirror(s) of a first optical switch matrix (not shown) of the second optical switch core 260. Another servo module $225_{j+1}$ is connected to both the destination I/O port module $215_d$ and one or more mirror(s) of a second optical switch matrix (not shown) of the second optical switch core 260. The orientation of these mirrors produces the redundant optical path 810.

To establish and maintain the redundant optical path 810 for the light signal, a SCM $236_2$ may be implemented with a dedicated time-slot switching arrangement in order to support continuous communications between the servo module and another redundant servo module associated with the destination I/O port module. As shown, the SCM $236_2$ is also duplicated so that each servo module $225_{i+1}$ and $225_{j+1}$ is connected to at least two SCMs $236_2$ and $237_2$. Thus, the redundant optical path 810 is maintained even when one of the SCMs $236_2$ and $237_2$ fails. The SCMs $236_2$ and $237_2$ associated with the second optical switch core 260 communicate via the first NCM 238, and the second NCM $238_2$, respectively. The second NCM $238_2$ is in communication with the first NCM $238_1$ to allow all SCMs and servo modules to communicate for coordination of the primary optical path 800 and the redundant optical path 810.

While certain exemplary embodiments have been described and shown in the accompanying drawings, it is to be understood that such embodiments are merely illustrative of and not restrictive of the broad invention, and that this invention not be limited to the specific constructions and arrangements shown and described, since various other modifications may occur to those ordinarily skilled in the art.

What is claimed is:

1. A scalable, optical cross-connect switching system comprising:
   an input/output (I/O) subsystem including a plurality of removable I/O port modules each adapted to receive an incoming light signal and to produce at least two outgoing light signals based on the incoming light signal;
   a switch subsystem to route each outgoing light signal over different optical paths; and
   a switch control subsystem coupled to the switch subsystem and the I/O subsystem, the switch control subsystem to adjust the optical paths provided by the switch subsystem and including a servo module coupled to a plurality of tap couplers for a first I/O port module, the servo module to receive an optical tap signal from one of the plurality of tap couplers and to inject a substitute light signal back to the plurality of tap couplers in response to information provided by the optical tap signal.

2. The optical cross-connect switching system of claim 1, wherein the switch subsystem includes a plurality of removable optical switches.

3. The optical cross-connect switching system of claim 2, wherein the plurality of optical switches of the switch subsystem are a plurality of micro-machined mirrors.

4. The optical cross-connect switching system of claim 1, wherein the switch subsystem includes (1) a first optical switch core including a first plurality of micro-machined mirrors to route a first outgoing light signal of the at least two outgoing light signals over a first optical path and (2) a second optical switch core including a second plurality of micro-machined mirrors to route a second outgoing light signal of the at least two outgoing light signals over a second optical path.

5. An optical cross-connect switching system comprising:
   an input/output (I/O) subsystem including a plurality of removable I/O port modules each adapted to receive an incoming light signal and to produce at least two outgoing light signals based on the incoming light signal;

a switch subsystem to route each outgoing light signal over different optical paths, the switch subsystem includes (1) a first optical switch core including a first plurality of micro-machined mirrors to route a first outgoing light signal of the at least two outgoing light signals over a first optical path and (2) a second optical switch core including a second plurality of micro-machined mirrors to route a second outgoing light signal of the at least two outgoing light signals over a second optical path, one of the first and second optical switch cores can be replaced without disrupting operations of the optical cross-connect switching system; and a switch control subsystem coupled to the switch subsystem and the I/O subsystem, the switch control subsystem to adjust the optical paths provided by the switch subsystem.

6. An optical cross-connect switching system comprising:

an input/output (I/O) subsystem including a plurality of removable I/O port modules each adapted to receive an incoming light signal and to produce at least two outgoing light signals based on the incoming light signal;

a switch subsystem to route each outgoing light signal over different optical paths, the switch subsystem includes (1) a first optical switch core including a first plurality of micro-machined mirrors to route a first outgoing light signal of the at least two outgoing light signals over a first optical path and (2) a second optical switch core including a second plurality of micro-machined mirrors to route a second outgoing light signal of the at least two outgoing light signals over a second optical path, a power level of the first outgoing light signal is substantially equivalent to a power level of the second outgoing light signal; and a switch control subsystem coupled to the switch subsystem and the I/O subsystem, the switch control subsystem to adjust the optical paths provided by the switch subsystem.

7. An optical cross-connect switching system comprising:

an input/output (I/O) subsystem including a plurality of removable I/O port modules each adapted to receive an incoming light signal and to produce at least two outgoing light signals based on the incoming light signal, the I/O subsystem includes a source I/O port module and a destination I/O port module, the source I/O port module to (a) perform a bridging operation on the incoming light signal for producing the at least two outgoing light signals and (b) provide an optical tap signal to the switching control subsystem;

a switch subsystem to route each outgoing light signal over different optical paths, the switch subsystem includes (1) a first optical switch core including a first plurality of micro-machined mirrors to route a first outgoing light signal of the at least two outgoing light signals over a first optical path and (2) a second optical switch core including a second plurality of micro-machined mirrors to route a second outgoing light signal of the at least two outgoing light signals over a second optical path; and a switch control subsystem coupled to the switch subsystem and the I/O subsystem, the switch control subsystem to adjust the optical paths provided by the switch subsystem.

8. The optical cross-connect switching system of claim 7, wherein the switch control subsystem includes a first servo module coupled to the source I/O port module and the first optical switch core, the first servo module to receive the optical tap signal from the source I/O port module and to adjust the first plurality of micro-machined mirrors of the first optical switch core in response to information provided by the optical tap signal so as to reflect the first outgoing light signal along the first optical path.

9. The optical cross-connect switching system of claim 8, wherein the switch control subsystem further includes a second servo module coupled to the first optical switch core and the destination I/O port module, the second servo module to receive an optical tap signal from the destination I/O port module and to operate in cooperation with the first servo module to adjust the first plurality of micro-machined mirrors to reflect the first outgoing light signal along the first optical path.

10. The optical cross-connect switching system of claim 9, wherein the switch control subsystem further includes a third servo module coupled to the second optical switch core and the source I/O port module, the third servo module to receive a second optical tap signal from the source I/O port module and to adjust the second plurality of micro-machined mirrors of the second optical switch core in response to information provided by the second optical tap signal so as to reflect the second outgoing light signal along the second optical path.

11. The optical cross-connect switching system of claim 10, wherein the switch control subsystem further includes a fourth servo module coupled to the second optical switch core and the destination I/O port module, the fourth servo module to receive a second optical tap signal from the destination I/O port module and to operate in cooperation with the third servo module to adjust the second plurality of micro-machined mirrors to reflect the second outgoing light signal along the second optical path.

12. The optical cross-connect switching system of claim 9, wherein the switch control subsystem further includes a servo control module coupled to at least the first servo module and the second servo module, the servo control module to enable the first servo module to communicate with the second servo module.

13. The optical cross-connect switching system of claim 12, wherein the switch control subsystem further includes a redundant servo control module coupled to the first servo module and the second servo module, the redundant servo control module to enable the first and second servo modules to communicate in the event that the first servo control module is non-operational.

14. The optical cross-connect switching system of claim 12, wherein the switch control subsystem further includes a network control module coupled to the first servo control module associated with the first servo module and the second servo modules and a second servo control module associated with a third servo module and a fourth servo module, the network control module to enable the first and second servo control modules and the first, second, third and fourth servo modules to communicate for adjustment of the first optical path and the second optical path.

15. The optical cross-connect switching system of claim 1, wherein the servo module of the switching control subsystem includes a laser for injecting of the substitute light signal back to the plurality of tap couplers.

16. The optical cross-connect switching system of claim 1, wherein the substitute light is within the same wavelength range as the incoming light signal.

17. An input/output (I/O) port module comprising:

a substrate; and a data propagation circuit mounted on the substrate, the data propagation circuit to (1) receive an incoming light signal, (2) produce at least two bridged light signals collectively having a power level substantially equal to a power level of the incoming light signal, and (3) output at least two outgoing light signals based on the at least two bridged light signals.

18. The I/O port module of claim 17, wherein the substrate is a printed circuit board including a first interface to receive the incoming light signal over a plurality of optical fiber links.

19. The I/O port module of claim 17, wherein the data propagation circuit includes a passive splitter that produces the at least two bridged light signals.

20. The I/O port module of claim 19, wherein the at least two bridged light signals produced by the passive splitter have substantially equal power levels.

21. The I/O port module of claim 19, wherein the at least two bridged light signals produced by the passive splitter have substantially disproportionate power levels.

22. The I/O port module of claim 19, wherein the data propagation circuit further includes at least two tap couplers coupled to the passive splitter, each tap coupler to separate one of the at least two bridged light signals into one of the at least two outgoing light signals and an optical tap signal for use in monitoring a power level of the one of the at least two outgoing light signals.

23. The I/O port module of claim 18, wherein the substrate includes a second interface to receive at least two light signals over a plurality of optical fiber links from an optical switch fabric.

24. The I/O port module of claim 23, wherein the data propagation circuit further includes an optical switch to select one of the at least two light signals received over the second interface for output via the first interface.

25. The I/O port module of claim 23 further comprising at least one additional data propagation circuit communicatively coupled to the first interface and the second interface, the data propagation circuit and the at least one additional data propagation circuit correspond to a number of ports associated with the I/O port module.

26. The I/O port module of claim 24 further comprising a control circuit to provide control signals for selection of one of the at least two light signals for output from the optical switch.

27. The I/O port module of claim 26, wherein the control circuit further receives light signal quality information pertaining to the at least two light signals from modules situated remotely from the I/O port module.

28. The I/O port module of claim 26, wherein the control circuit further comprises
a processing unit; and
a programmable memory coupled to the processing unit, the programmable memory to contain software executable by the processing unit for providing the control signals.

29. The I/O port module of claim 28, wherein the programmable memory of the control circuit contains information used by the processing unit to control a state of a plurality of status identification component to identify that the I/O port module is operational and which ports of the I/O port module are operational.

30. A servo module comprising:
a servo mirror control module configure for adjusting an optical path of a light signal from a source to a destination; and
an optical detector module in communication with and removably coupled to the servo mirror control module, the optical detector module to monitor a power level of the light signal to determine whether to adjust the optical path.

31. The servo module of claim 30, wherein disconnection of the optical detector module from the servo mirror control module causes the servo mirror control module to halts adjustment of the optical path until the optical detector module is reconnected to the servo mirror control module.

32. The servo module of claim 30, wherein the optical detector module comprises:
a first processing unit; and
a plurality of detection/modulation (DM) circuits coupled to the first processing unit, each DM circuit to convert an optical tap signal adapted for sensing a power level of the light signal at the source into a first measured power sense signal that can be analyzed by the first processing unit.

33. The servo module of claim 32, wherein at least one DM circuit comprises:
a first optical-to-electrical (O/E) detector to convert the optical tap signal into an electrical control signal; and
an analog-to-digital converter to perform a digital conversion of the electrical control signal to produce the first measured power sense signal.

34. The servo module of claim 33, wherein the optical detector module further comprises an amplifier coupled to both the O/E detector and the analog-to-digital converter to amplify the electrical control signal.

35. The servo module of claim 32, wherein the servo mirror control module comprises:
a second processing unit coupled to the first processing unit; and
a plurality of mirror signal detection and generation (SDG) circuits coupled to and controlled by the second processing unit.

36. The servo module of claim 35, wherein each SDG circuit includes
an analog-to-digital converter;
a digital-to-analog converter;
a plurality of hinge position sensors coupled to the analog-to-digital converter; and
a plurality of high voltage drivers coupled to the digital-to-analog converter.

37. The servo module of claim 35 further comprising a third processing unit coupled to the second processing unit, the third processing unit to provide a second measured power sense signal associated with the light signal at the destination.

38. The servo module of claim 32, wherein the DM circuit further comprises a laser to inject a substitute light signal into the optical path.

39. The servo module of claim 38, wherein the substitute light is within the same wavelength range as the light signal.

40. A method of transferring optical signals in a scalable cross-connect switching system, the method comprising:
receiving an incoming light signal;
producing a first outgoing light signal and a second outgoing light signal based on the incoming light signal by
separating the incoming light signal into a first bridged light signal and a second bridged light signal, and
separating the first bridged light signal into a first optical tap signal and the first outgoing light signal, the first optical tap signal is used for controlling the first optical switch core to improve integrity of the first outgoing light signal;
routing the first outgoing light signal through a first optical switch core between a source input/output (I/O) port module and a destination I/O port module; and routing of the second outgoing light signal through a second optical switch core between the source I/O port module and the destination I/O port module.

41. The method of claim 40, wherein the producing of the first outgoing light signal and the second outgoing light signal further comprises separating the second bridged light signal into a second optical tap signal and the second outgoing light signal, the second optical tap signal being used for controlling the second optical switch core to improve integrity of the second outgoing light signal.

42. The method of claim 40, wherein a power level of the first optical tap signal is less than a power level of the first outgoing light signal.

43. The method of claim 41, wherein a power level of the second optical tap signal is less than a power level of the second outgoing light signal.

44. An optical cross-connect switching system comprising:
- a switch subsystem including a plurality of removable optical switch cores;
- an input/output (I/O) port module in communication with the switch subsystem, the I/O port module including at each port:
  - a splitter to produce at least two bridge signals from an incoming light signal,
  - a first tap coupler communicatively coupled to the splitter, the first tap coupler to produce a first outgoing light signal routed to the switch subsystem and a first optical tap signal, and
  - a second tap coupler communicatively coupled to the splitter, the second tap coupler to produce a second outgoing light signal routed to the switch subsystem and a second optical tap signal; and
- a servo module in communication with the I/O module, the servo module to receive the first optical tap signal and to control the switch subsystem based on information provided by the first optical tap signal.

45. The optical cross-connect switching system of claim 44, wherein the I/O port module further comprises:
- an optical switch; and
- a control circuit coupled to the optical switch and the servo module, the control circuit to control operations of the optical switch.

46. The optical cross-connect switching system of claim 44, wherein the servo module further comprises an optical detector module and a servo mirror control module.

47. The optical cross-connect switching system of claim 46, wherein the servo mirror control module includes logic to adjust mirror orientations within the switch subsystem in response to measured power sense signals from the optical detector module.

48. The optical cross-connect switching system of claim 46, wherein the optical detector module to receive the first optical tap signal, convert the first optical tap signal into an electrical control signal, amplify the electrical control signal, and digitize the electrical control signal to produce the measured power sense signals.

49. The optical cross-connect switching system of claim 46, wherein the optical detector module can be disconnected from the servo mirror control module without disrupting operations of the optical cross-connect switching system.

50. The optical cross-connect switching system of claim 49, wherein the servo mirror control module halts further adjustment of the switch subsystem until the optical detector module is reconnected to the servo mirror control module.

51. The optical cross-connect switching system of claim 44, wherein the servo module includes a laser to inject a substitute light signal back to the I/O port module for integrity enhancement of the first outgoing light signal.

* * * * *